United States Patent [19]

Neufang

[11] 3,790,713

[45] Feb. 5, 1974

[54] FOUR-WIRE SWITCHING OF JUNCTIONS IN TDM PCM SWITCHING CENTERS UNDER STORED-PROGRAM CONTROL

[75] Inventor: Karlheinz Neufang, Munich, Germany

[73] Assignee: Siemens Aktiengesellschaft, Berlin, Germany

[22] Filed: Feb. 23, 1972

[21] Appl. No.: 228,541

[30] Foreign Application Priority Data

Feb. 24, 1971 Germany .................. P 21 08 745.6

[52] U.S. Cl. .......................................... 179/15 AT

[51] Int. Cl. .......................................... H04j 3/00

[58] Field of Search ......179/18 ES, 18 GF, 15 AQ, 179/15 AT

[56] References Cited

UNITED STATES PATENTS

| | | | |
|---|---|---|---|
| 3,597,548 | 8/1971 | Drinnan | 179/15 AT |
| 3,458,659 | 7/1969 | Sternung | 179/15 AQ |
| 3,106,615 | 10/1963 | Spjelongs | 179/18 GF |

*Primary Examiner*—William C. Cooper
*Assistant Examiner*—David L. Stewart
*Attorney, Agent, or Firm*—William E. Schuyler, Jr. et al.

[57] ABSTRACT

A telephone exchange serving PCM time division four-wire junction lines having switching centers under the control of a stored program central control unit is described. A connecting-through unit including a complete storage device for the incoming and outgoing directions for holding all the information elements arriving during a complete system scanning period, decoupling means for maintaining the separation of the internal and external pulse repetition rates, and a monitoring means for controlling the synchronization signal in the incoming channel, is allocated to each four-wire junction line. Spatial coupling point elements accessed by the four-wire line provide connections between the incoming and outgoing channels. Holding storage devices link each complete storage device and appropriate coupling points. The holding storage devices and coupling points are controlled by a path finding means to provide the required spatial and time coupling between incoming and outgoing channels. The foregoing apparatus removes the need for specially constructed switching centers for use with pulse code modulated signals.

3 Claims, 4 Drawing Figures

FOUR-WIRE SWITCHING OF JUNCTIONS IN TDM PCM SWITCHING CENTERS UNDER STORED-PROGRAM CONTROL

BACKGROUND OF THE INVENTION

Conventional switching centers employed in telecommunication exchanges, particularly telephone exchanges, use the space multiple principle, that is spatially separated lines which can be interconnected by spatially separated coupling point elements allocated to the individual communication channels. In addition to this space multiplex principle, the time division multiplex principle, whereby temporarily discontinuous signals are transmitted, has found an ever increasing acceptance in recent years. Preferably, a fairly large number of communication channels composed of temporarily discontinuous signals are transmitted via the same line. Among the transmission methods utilizing the time division multiplex system, considerable importance has been achieved by the methods wherein the amplitude information is transferred as digital values. The best known representative of this type of transfer is the pulse code modulation (PCM) system, wherein the amplitude information to be transferred is sampled at periodically consecutive points of time and represented by binary words. These binary words are transferred in periodically consecutive "time slots." The periodically consecutive time slots allocated to one communication link form a time channel. The time slots included within a scanning period plus other time slots allocated to identification and synchronization channels jointly comprise a pulse frame. The synchronization signals of the aforesaid synchronization channel have for their objective the control of a synchronization unit which assures the correspondence between time channels in the pairs of wires of all PCM four-wire junction lines allocated to incoming traffic. It is conventional to store the information elements coming in on a PCM four-wire junction line during such a pulse frame in a complete storage device. From these storage devices are read out the information elements allocated to a time channel, whereby the free communication segments suitable for the desired communication and determined by a path-seeking means are taken into account. This read-out procedure is controlled by holding storage devices which are controlled by the path-finding means and which bring about the time and spatial coordination of the selected communication links.

In introducing novel types of switching centers such as, for example a multiplex time division switching center pulse code modulation, numerous technical and organizational problems are encountered. These problems arise, for example, from the necessity that the novel switching center must cooperate with existing switching systems. Other problems result from the fact that the novel switching systems, at least during the introductory period, must be operated in a first expansion stage of limited scope.

SUMMARY OF THE INVENTION

The aforementioned and other objects are achieved according to the invention in an arrangement which makes it possible to largely dispense with the normally required premature costs of central equipment in a limited telephone exchange expansion. Essentially, the invention utilizes a circuit arrangement having switching centers which are preferably under the control of a stored-program central control unit, to which are connected four-wire junction lines. Each line serves as a carrier for a plurality of time division multiplex pulse code modulation communication channels. Thus to each communication link between a calling and a called subscriber are allotted an incoming and an outgoing communication time channel running via one of the two pairs of wires of one of the four-wire junction lines. A complete storage device is provided for storing all information elements coming in on a four-wire junction line during one of the pulse frames occurring during the system scanning period. Holding storage elements controlled by a path-finding means of the central control unit control the required spatial and time coupling of the communication channels in one of the aforesaid incoming communication time channels to an outgoing time channel continuing in a desired direction. The stated object is achieved in that to each of the aforesaid four-wire junction lines that is individually allocated a connecting-through unit which contains a complete storage device for the incoming and outgoing communication directions, decoupling units for maintaining separation between the pulse repetition rate (internal exchange rate) in the switching center and the pulse repetition rate (segment rate) prevailing on the pair of wires of the four-wire line serving as carriers for the incoming communication time channels; and a monitoring unit for control of a synchronization signal contained in one of the incoming communication channels. Further, all spatial coupling-point elements to which the communication time channels sent over the four-wire junction line are directly accessed, as well as the holding storage devices, are controlled by the aforesaid path-finding means and bring about the spatial and time coordination of these coupling-point elements and the storage locations of the aforesaid complete storage device allocated to the individual communication channels of the four-wire junction line. The arrangement in accordance with the invention makes it possible when connecting four-wire junction lines of the above-mentioned type to existing switching centers having central control units, to largely dispense with central installations which are specifically adapted to the requirements of the pulse code modulation principle. This is particularly advantageous when the portion of the communication time channels utilized in accordance with the time division multiplex principle with pulse code modulation during an exchange introductory period is comparatively small. Furthermore, the invention has the advantage that, regardless of the number of connected four-wire junction lines with pulse code modulation, the variety of the components can be reduced substantially as a result of the individual allocation of the devices required for each line, so that production and storage of the components are evidently improved or simplified.

To establish a coupling network over which the individual communication time channels of the connected four-wire junction lines can be coupled to each other, it is necessary to interconnect the coupling elements in the connecting-through units. This is accomplished according to a further development of the invention because the coupling point elements of a group of connecting-through units provided with the same selection address and allocated to the outgoing communication time channels are in each case combined via OR elements. The outputs of these OR elements are connected via a system of auxiliary lines to the coupling point elements of this group of connecting-through units likewise combined in accordance with their common selection addresses and allocated to the outgoing communication time channels.

It is conventional that the time slots within the pulse frame identified by a common selection address are assigned to the communication time channels corresponding to the two traffic directions (incoming and outgoing) of a communication link, in other words, both traffic directions of a communication link as switched to one and the same phase. This occurs via different pairs of wires of the four-wire junction line in question. Thus, it is basically ruled out that a communication link is developed between pairs of channels running via the same four-wire junction line. Thus the invention has the further objective of the provision for the possibility of a connection of two communication circuits, each consisting of an incoming and an outgoing communication time channel, wherein the two incoming communication time channels are assigned to one pair of wires and the two outgoing channels to the other pair of wires of the same four-wire junction line. Thus the incoming and the outgoing communication time channels of each of the two communication circuits have the same time position within the pulse frame.

The invention is further characterized by the fact that to a group of four-wire junction lines there is jointly allocated another of the above-mentioned connecting-through units whose input and output are not connected to a pair of wires of an additional four-wire junction line, but directly to each other. The coupling points of this additional connecting-through unit are incorporated into the system of auxiliary lines allocated to the aforesaid group of four-wire junction lines. A particular advantage of this further development is that a switching connection of two PCM communication circuits running via the same four-wire junction line is made possible without disturbing the above-mentioned uniformity of the component parts to be used, since the connecting-through unit required for reconnecting-through PCM connections on the same four-wire junction line has basically the same structure as the connecting-through units allocated individually to the separate four-wire junction lines.

Another desirable feature of the invention relates to an arrangement for monitoring and alternate switching of the connecting-through units constructed in accordance with the invention. It is characterized by the fact that an additional connecting-through unit is allocated to a group of four-wire junction lines, and that a switch is provided, through which the input of this additional connecting-through unit can be connected alternatively to the inputs of the connecting-through units already allocated to the group of junction lines. An additional switch is provided through which the outgoing pairs of wires of this group of junction lines can be separated alternatively from the outputs of the connecting-through units allocated thereto and connected to the input of the additional connecting-through unit. The output of the additional connecting-through unit is connected, via a register, to the first input of a comparing unit, whose second input can be connected alternatively, via a third switch, to the outputs of the connecting-through units allocated to the aforesaid group of four-wire junction lines. To provide a monitoring function the input of the additional connecting-through unit is connected in parallel, via a contact of the first-mentioned switch, to the input of the connecting-through unit to be monitored; and the second input of the comparing unit, via a contact of the third switch, to the outgoing pair of wires over which runs the communication link to be monitored. In case alternate switching is desired, the input of the additional connecting-through unit is connected in parallel, via a contact of the first-mentioned switch, to the input of the connecting-through unit to be replaced; the pair of wires connected to the output of the replaced connecting-through unit is separated from this output by means of a contact of the aforesaid additional switch and connected to the output of the additional connecting-through unit.

BRIEF DESCRIPTION OF THE DRAWINGS:

An exemplary embodiment of the invention is shown in the drawings, wherein.

Figures 1, 2:
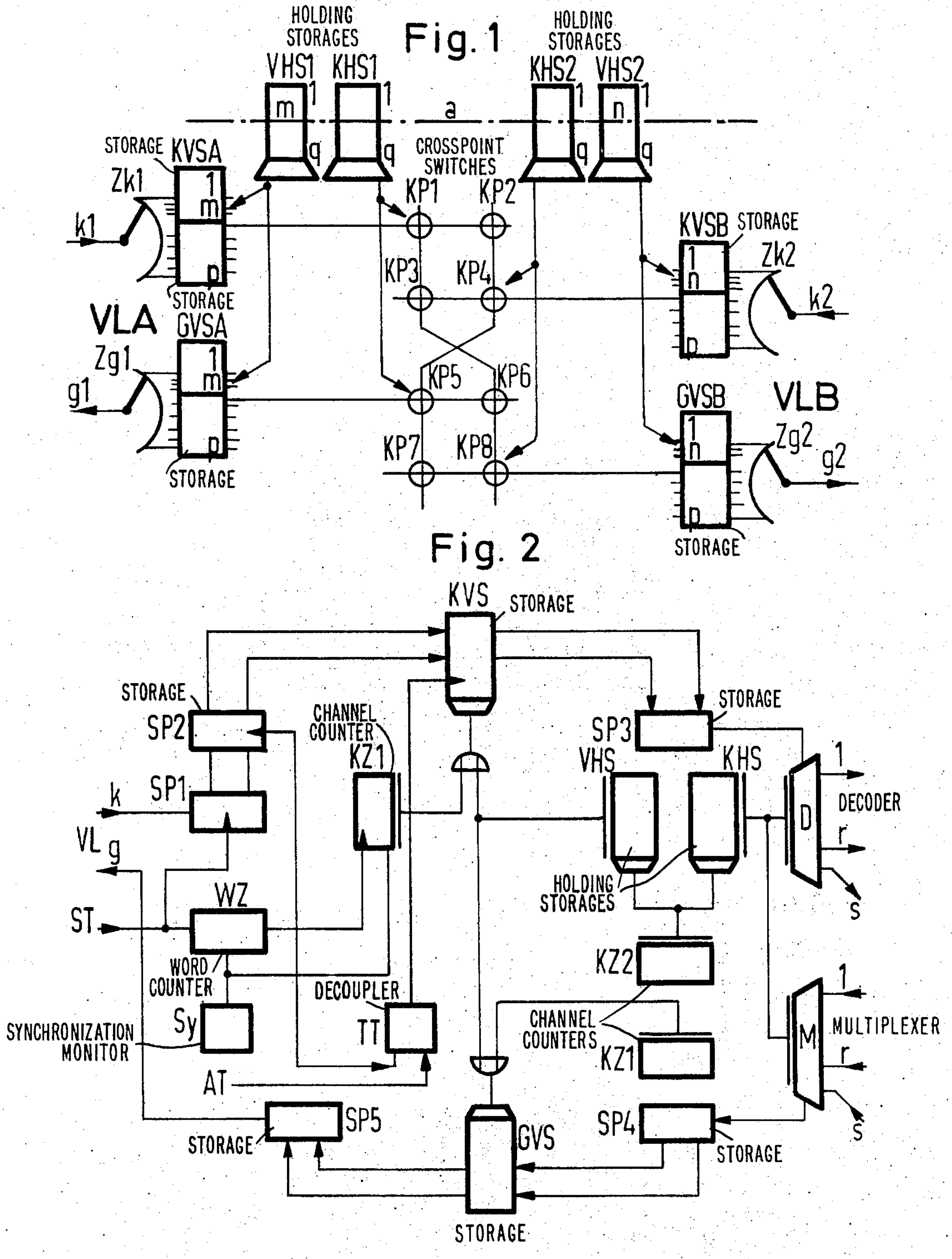
FIG. 1 shows the principle of the switching means for PCM four-wire junction lines underlying the invention.
FIG. 2 shows a block diagram of a connecting-through unit constructed in accordance with the invention and individually allocable to the separate PCM junction lines.

DETAILED DESCRIPTION OF THE PREFERRED EMBODIMENTS:

In FIG. 1 are shown two PCM four-wire junction lines — hereinafter called PCM line — VLA and VLB. The PCM line VLA comprises the incoming pair of wires $k_1$ and the outgoing pair of wires $g_1$, and the PCM line VLB comprises the pairs of wires $k2$ and $g2$. To each PCM line are allocated a complete storage device for the incoming and outgoing communication direction, which are connected to the corresponding pairs of wires $k1 \ldots g2$ via counters $Zk1$, $Zk2$, $Zg1$ and $Zg2$. These counters can be stepped forward with the pulse repetition rate prevailing on the line or abutting in the switching center. Each of the complete storage devices has access to a series of coupling point. The coupling points allocated to the various PCM lines are in communication with each other via auxiliary lines. A holding storage is in each case allocated to the complete storage device of a PCM line, as well as to the coupling points to which these complete storage devices have access. Thus, complete storage devices KVSA and GVSB of PCM line VLA are under the controlling influence of holding storage VHS1. The coupling points KP1, KP2 and KP5, KP6 respectively allocated to these complete storage devices are under the controlling influence of holding storage KHS1. The same is true of holding storages VHS2 and KHS2. Each complete storage device has a number $p$ of storage locations corresponding to the number of time slots available in one of the pulse frames used in the system. Counters $Zk1$ and $Zk2$ assign addresses for reading in the information elements coming in on the pairs of wires $k1$ or $k2$; thus the information corresponding to a specific communication time channel is always read into the same storage location in the storage device. Let is be assumed that channel $m$ — that is, the communicationn time channel to which in the storage device the storage location $m$ is allocated — of the PCM line VLA is to be connected to channel $n$ of the PCM line VLB. By means of a path-finding means (not shown herein) free coupling points suitable for the communication link, as well as one of the $q$ connecting-through phases are established, whereby the incoming data storage devices KVSA and KVSB can be read out. Let it be supposed that this is phase $a$. The holding storage devices activate at the point of time of each scanning period corresponding to this phase $a$ the selected coupling points (in the example, KP1 and KP5 for PCM line VLA, and KP 4 and KP8 for PCM line VLB), and cause reading-out of the information contained in the storage location $m$ of storage device KVSA, and corresponding location $n$ of storage device KVSB, and reading in on the storage locations $n$ of storage device GVSB, and $m$ of storage device GVSA. The data is read out therefrom by means of counters $Zg2$, $Zg1$ respectively, as controlled by the adjoining pulse repetition rate in the switching center, and transmitted to the outgoing pairs of lines of PCM lines VLB, VLA respectively.

FIG. 2 shows the block diagram of one of the connecting-through units individually allocated, in accordance with the invention, to the separate PCM lines. The connecting-through unit has storage units SP1—SP5, each unit having a capacity of a binary word contained in a time slot of the pulse frame. In addition, the connecting-through unit shown has a word counter WZ, as well as channel counters KZ1 to KZ3, a decoder D, and a multiplexer M, through which the coupling points are reached as well as storage device KVS allocated to the incoming pair of wires of the PCM line, storage device GVS allocated to the outgoing pair of wires of the PCM line, and holding storages VHS and KHS. Channel counter KZ1 is under the control of a synchronization-monitoring unit Sy. These units are all of conventional design.

The information coming in via incoming pair of wires $k$ of PCM line VL is read into the storage SP1 with the pulse repetition rate prevailing on the line (the segment rate ST). As soon as storage SP1 contains a complete binary word, word counter WZ, which is likewise controlled by segment rate ST, causes a parallel transfer thereof into storage SP2. Word counter WZ further transmits a signal to the decoupling device TT which serves to separate the repetition rate separation between the segment rate and the exchange (internal) rate. This repetition rate device TT determines the point of time at which the binary word contained in storage SP2 is read in parallel into storage device KVS. The monitoring unit Sy, which establishes the position of the time slot within a pulse frame corresponding to the synchronization channel oversees the transfer of the contents of storage SP2 to the correct address, that is, to the storage location assigned to the corresponding time channel in storage device KVS.

During the read-out procedure from store KVS, holding storage device VHS indicates the address of the storage location of store KVS whose information shall be transferred into storage SP3. Holding store VHS further indicates the address of the storage location in the outgoing store GVS allocated to the outgoing pair of wires $g$ of PCM line VL, wherein (in the same connecting-through phase) the contents of store SP4 shall be transferred. Holding store KHS which is allocated to the decoder D and multiplexer M, fixing the coupling points, concurrently indicates the addresses of the coupling points or auxiliary lines to which the storage contents of store SP3 are transmitted, and from which a piece of information is read into storage SP4. Holding stores HVS and KHS are controlled by channel counters KZ2, whose pulse repetition rate is preferably greater than that of channel counters KZ1 and KZ3. By means of channel counter KZ3 the information read in store GVS is transferred in parallel into store SP5, and with the frequency of internal exchange rate AT transmitted in series to the outgoing pair of wires $g$ of PCM line VL.

The devices decoder D and multiplexer M which determine the coupling points have an output $s$ (coupling point) or input $s$, which are not connected to the coupling points of other PCM lines via auxiliary lines, as the other outputs or inputs 1 to $r$, but to an identification-processing device. Via coupling points $s$ of decoder D, the identification channel of the incoming pair of wires $k$ of PCM line VL is connected through via storage device KVS. Via coupling point $s$ of multiplex M, the identification channel and the synchronization channel for the outgoing pair of wires $g$ of PCM line VL are connected via storage device GVS.

Figure 3:
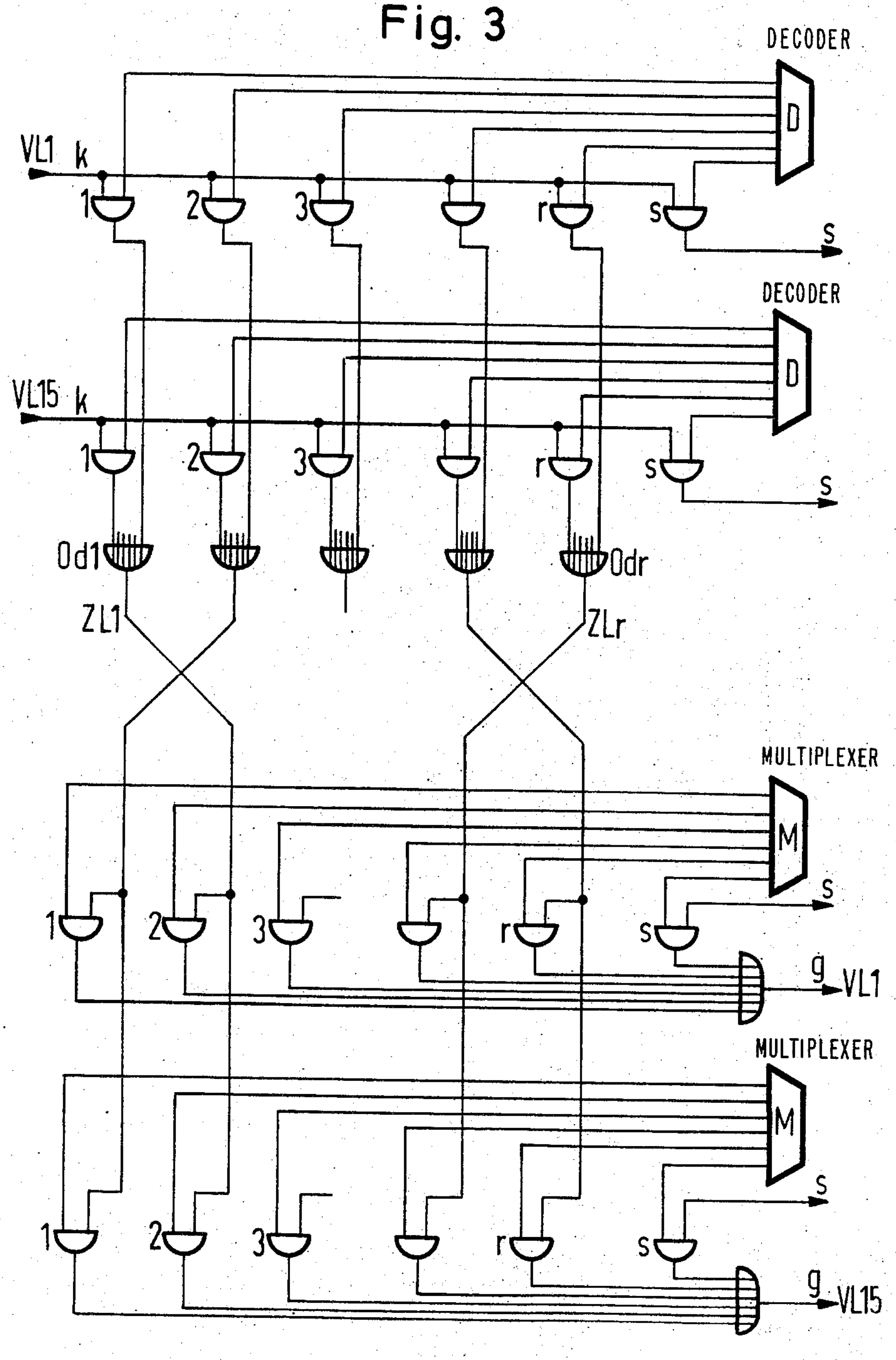
FIG. 3 illustrates the system of auxiliary lines over which are interconnected the connecting-through units allocated to a group of PCM four-wire junction lines.

FIG. 3 shows the system of auxiliary lines allocated to a group of PCM lines. Of the coupling points $l$ to $r$ allocated to the incoming pairs of wires of the PCM lines, those identified by the same selection address are combined via OR elements Odl to Odr. The outputs of OR elements Odl to Odr are in communication, via auxiliary lines, with the coupling points allocated to the outgoing pairs of wires of the PCM lines, with which, in turn, the coupling points provided with the same selection address is combined. The incoming and outgoing coupling points having the selection address $s$ are in communication with the identification-processing device. It is possible, through a suitably selected auxiliary line wiring, to form PCM coupling fields of practically any size; the number of switching means provided increases proportionally with the number of the connected PCM lines.

Figure 4:
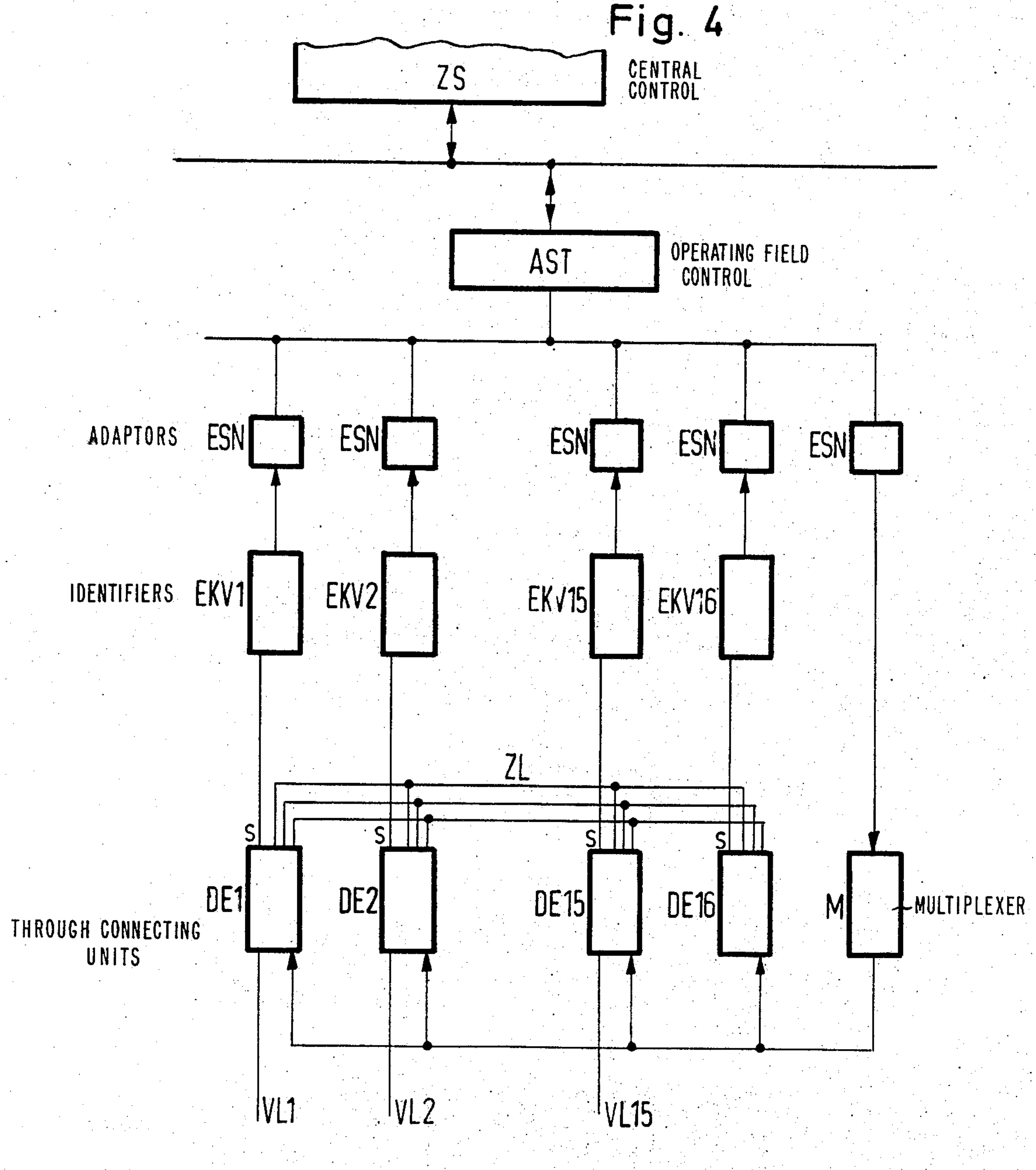
FIG. 4 shows the insertion of PCM four-wire junction lines and the individually allocated connecting-through units into a switching center having a central control unit.

FIG. 4 illustrates the insertion PCM lines and connecting-through units individually allocated thereto into a switching center having central electronic control. In addition to the connecting-through units DE1 to DE15 allocated to PCM lines VL1 to VL15, an additional connecting-through unit DE16 is provided. This added unit is not allocated to a PCM line, but is in communication with the other connecting-through units via auxiliary line system ZL. In the manner described hereinabove, the "internal traffic," that is, the mutual switching of different channels running via the same PCM line, can be handled via this additional connecting-through unit D16. Each of the connecting-through unit DE1 to DE16 is connected to an associated identification-processing unit EKV1 to EKV16 via a coupling line $s$, which is not incorporated into the auxiliary line system ZL. These identification-processing units are in communication with the working-field control unit AST via adaptors ESN, which, in turn, control the exchange of information between the central control unit ZS and the decentralized units EKV, DE respectively. The information coming from the path-finding means (not shown herein) of the central control unit ZS for holding storages VHS, KHS respectively, contained in connecting-through units DE1 to DE16 is transmitted thereto. It is to be noted that the identification-processing units EKV and, therewith, the corresponding adaptors ESN, can be dispensed with, if the central control units ZS of the switching centers participating in the formation of the communication are interconnected via central data channels. Of course, central control units or computers for controlling exchange operations are well known and need not be described in detail herein.

It will be noted that the preferred embodiment of the invention is described herein in the form of an arrangement of known telecommunication components. As pointed out hereinabove, these components, not described in detail, are known in the art and they will be recognized by their identification. Accordingly, a detailed structural description of these components is not given herein.

Although certain preferred embodiments of the invention have been disclosed for purposes of illustration, it will be evident that various changes and modifications may be made therein without departing from the scope and spirit of the invention.

I claim:

1. In a circuit arrangement for telecommunication systems for transmitting pulse code modulated signals having switching centers controlled by a store program central control means, said switching centers being interconnected through trunks having at least four wires, each said trunk being a carrier for a number of time multiplex communication channels, communication links being formed thereover, each having an incoming and an outgoing time multiplex channel, said time multiplex channels carrying additionally timing and synchronizing signals, and including first storage means for storing information arriving on said trunks during a pulse frame having a duration corresponding to a sampling period, and further including second storage means controllable by a line selector means for controlling the spatial and time coupling of said communication channels for transmitting the signals in one of said incoming time channels to an outgoing time channel in accordance with the desired route, the ones of said channels connected using spatial coupling having outputs connected to control inputs of spatial crosspoint switching means, the ones of said communication channels connected using time coupling having outputs thereof connected to a storage for effecting write-in in the case of outgoing communications and read-out in the case of incoming communications, the improvement comprising:

a plurality of through-connecting means, one of which is allocated to each said trunk including third storage means for incoming and outgoing communication routes, and third storage means being coupled to said time coupled channels, decoupling means for separating timing frequencies in said switching center from clock frequencies appearing on said incoming, time coupled channels, and monitoring means for controlling said synchronizing signal, said trunks being connected to said switching centers as to have direct access to said spatial crosspoint switching means, said second storage means being controllable by said line selected means for spatial and time coordination of said crosspoint switching means, individual storage locations in said third storage means being allocated individually to said communication channels.

2. The improved circuit arrangement defined in claim 1 further comprising;

OR gate means, means connecting the said crosspoint switching means of predetermined ones of said through-connecting means allocated to incoming communication channels to inputs of said OR gate means and means connecting outputs of said OR gate means over ones of said trunks to the said crosspoint switching means of predetermined ones of said through-connecting means allocated to outgoing communication channels.

3. The improved circuit arrangement defined in claim 1 wherein two incoming communication time channels and two outgoing communication time channels are combined within the same one of said trunks, wherein said incoming and outgoing communication time channels forming communication links have the same time position within a pulse frame, and further comprising:

additional through-connecting means, jointly allocated to a group of said trunks, having a terminating means for enabling the coupling of additional information to said group of trunks and means for connecting crosspoint switching means in said additional through-connecting means to said group of trunks.

* * * * *